United States Patent
Lee

(10) Patent No.: US 10,423,194 B2
(45) Date of Patent: Sep. 24, 2019

(54) ELECTRONIC DEVICE AND IMAGE CAPTURE METHOD THEREOF

(71) Applicant: Samsung Electronics Co., Ltd., Suwon-si, Gyeonggi-do (KR)

(72) Inventor: Hwa Jun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/865,529

(22) Filed: Jan. 9, 2018

(65) Prior Publication Data
US 2018/0196472 A1     Jul. 12, 2018

(30) Foreign Application Priority Data

Jan. 9, 2017   (KR) .................. 10-2017-0002816

(51) Int. Cl.

| | |
|---|---|
| *G06F 1/16* | (2006.01) |
| *G06F 3/0488* | (2013.01) |
| *G02B 13/02* | (2006.01) |
| *G02B 13/06* | (2006.01) |
| *H04N 5/225* | (2006.01) |
| *H04N 5/232* | (2006.01) |

(Continued)

(52) U.S. Cl.
CPC .......... *G06F 1/1626* (2013.01); *G02B 13/02* (2013.01); *G02B 13/06* (2013.01); *G06F 1/1605* (2013.01); *G06F 1/1643* (2013.01); *G06F 3/0488* (2013.01); *H04M 1/72522* (2013.01); *H04N 5/2258* (2013.01); *H04N 5/23219* (2013.01); *H04N 5/23293* (2013.01); *H04N 7/188* (2013.01); *H04M 2250/52* (2013.01); *H04N 5/23296* (2013.01); *H04N 5/247* (2013.01)

(58) Field of Classification Search
None
See application file for complete search history.

(56) References Cited

U.S. PATENT DOCUMENTS

| | | |
|---|---|---|
| 7,469,054 B2 | 12/2008 | Aratani et al. |
| 7,526,193 B2 | 4/2009 | Minato et al. |
| (Continued) | | |

FOREIGN PATENT DOCUMENTS

| | | |
|---|---|---|
| EP | 1653279 A1 | 5/2006 |
| EP | 2120210 A2 | 11/2009 |
| KR | 10-2015-0139558 A | 12/2015 |

OTHER PUBLICATIONS

European Office Action dated May 23, 2019, issued in European Patent Application No. 18 150 812.8.

*Primary Examiner* — William B Perkey
(74) *Attorney, Agent, or Firm* — Jefferson IP Law, LLP

(57) ABSTRACT

An electronic device is provided. The electronic device includes a housing, a display exposed through a first surface of the housing, a first camera exposed through a second surface of the housing that is opposite to the first surface, a second camera exposed through the second surface, a memory storing an image obtained by the first or second camera, and a processor electrically connected with the display, the first camera, the second camera, and the memory. The processor is configured to output a first image obtained by using the first camera on the display and, when an area recognized as a face in the first image has a size satisfying a specified condition, output a second image obtained by using the second camera on the display.

19 Claims, 14 Drawing Sheets

(51) Int. Cl.
*H04N 5/247* (2006.01)
*H04N 7/18* (2006.01)
*H04M 1/725* (2006.01)

(56) References Cited

U.S. PATENT DOCUMENTS

| | | |
|---|---|---|
| 7,912,363 B2 | 3/2011 | Minato et al. |
| 8,594,390 B2 | 11/2013 | Yoshizumi |
| 8,860,849 B2 | 10/2014 | Misawa et al. |
| 9,185,291 B1 | 11/2015 | Shabtay et al. |
| 9,661,233 B2 | 5/2017 | Shabtay et al. |
| 9,679,394 B2 | 6/2017 | Yoshizumi |
| 2005/0128221 A1 | 6/2005 | Aratani et al. |
| 2007/0110422 A1 | 5/2007 | Minato et al. |
| 2009/0180696 A1 | 7/2009 | Minato et al. |
| 2009/0268943 A1 | 10/2009 | Yoshizumi |
| 2011/0050963 A1 | 3/2011 | Watabe |
| 2011/0242369 A1 | 10/2011 | Misawa et al. |
| 2014/0119601 A1 | 5/2014 | Yoshizumi |
| 2014/0232906 A1* | 8/2014 | Ha .................... H04N 5/265 348/239 |
| 2014/0253693 A1 | 9/2014 | Shikata |
| 2014/0341427 A1 | 11/2014 | Kawano |
| 2014/0361986 A1* | 12/2014 | Won .................. H04N 1/00307 345/156 |
| 2015/0049234 A1* | 2/2015 | Jung .................. H04N 5/2258 348/333.05 |
| 2016/0050374 A1 | 2/2016 | Shabtay et al. |
| 2016/0212358 A1 | 7/2016 | Shikata |
| 2017/0013179 A1* | 1/2017 | Kang .................. G06F 3/04883 |
| 2017/0034449 A1* | 2/2017 | Eum .................... H04N 5/2258 |
| 2017/0150061 A1 | 5/2017 | Shabtay et al. |
| 2018/0005045 A1 | 1/2018 | Kawano |
| 2018/0013957 A1* | 1/2018 | Irie ...................... G06F 3/0488 |
| 2018/0150709 A1* | 5/2018 | Ha ...................... H04N 5/2258 |
| 2018/0160046 A1* | 6/2018 | Nash .................. H04N 5/23296 |
| 2018/0182065 A1* | 6/2018 | Yoshida ................ G06T 3/0062 |
| 2018/0227506 A1* | 8/2018 | Lee .................... H04N 21/2387 |
| 2018/0309917 A1* | 10/2018 | Kim ................... H04N 5/2258 |

* cited by examiner

ELECTRONIC DEVICE AND IMAGE CAPTURE METHOD THEREOF

CROSS-REFERENCE TO RELATED APPLICATION(S)

This application claims the benefit under 35 U.S.C. § 119(a) of a Korean patent application filed on Jan. 9, 2017 in the Korean Intellectual Property Office and assigned Serial number 10-2017-0002816, the entire disclosure of which is hereby incorporated by reference.

TECHNICAL FIELD

The present disclosure relates to a technology for taking an image by using a plurality of cameras.

BACKGROUND

Various forms of electronic products have been developed and used with the development of electronics. Especially, in recent years, electronic devices, such as smartphones, tablet personal computers (PCs), wearable devices, and the like, which have a variety of functions, have been widely used. These electronic devices may include one or more cameras for taking an image. For example, the electronic devices may include a front camera module and a rear camera module, and the rear camera module may include two or more cameras.

The above information is presented as background information only to assist with an understanding of the present disclosure. No determination has been made, and no assertion is made, as to whether any of the above might be applicable as prior art with regard to the present disclosure.

SUMMARY

When taking a picture or a moving image with an electronic device of the related art, a user may have difficulty in accurately capturing a subject of interest (e.g., a person's face, a moving subject, or the like) among subjects included within the field of view of a camera. Meanwhile, when the electronic device automatically determines a subject in which the user is likely to be interested and zooms in on the corresponding subject, an unintended subject may be photographed.

Aspects of the present disclosure are to address at least the above-mentioned problems and/or disadvantages and to provide at least the advantages described below. Accordingly, an aspect of the present disclosure is to provide an electronic device and a method for automatically taking a high-quality image of an object in which a user is likely to be interested, by using some of a plurality of cameras.

In accordance with an aspect of the present disclosure, an electronic device is provided. The electronic device includes a housing, a display exposed through a first surface of the housing, a first camera exposed through a second surface of the housing that is opposite to the first surface, a second camera exposed through the second surface, a memory that stores an image obtained by the first camera or the second camera, and a processor electrically connected with the display, the first camera, the second camera, and the memory. The processor is configured to output a first image obtained by using the first camera on the display and, when an area recognized as a face in the first image has a size satisfying a specified condition, output a second image obtained by using the second camera on the display.

In accordance with another aspect of the present disclosure, an electronic device is provided. The electronic device includes a housing, a display exposed through a first surface of the housing, a first camera exposed through a second surface of the housing that is opposite to the first surface, a second camera exposed through the second surface, a memory that stores an image obtained by the first camera or the second camera, and a processor electrically connected with the display, the first camera, the second camera, and the memory. The processor is configured to output a first image obtained by using the first camera on the display and, when an area recognized as a moving subject in the first image has a size satisfying a specified condition, output a second image obtained by using the second camera on the display if an area recognized as a moving subject and included in the first image has a size satisfying a specified condition.

According to various embodiments of the present disclosure, an electronic device may be provided that automatically zooms in on a subject included in an image obtained by a first camera by using a second camera to obtain a normal image and a zoomed-in image of the subject.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
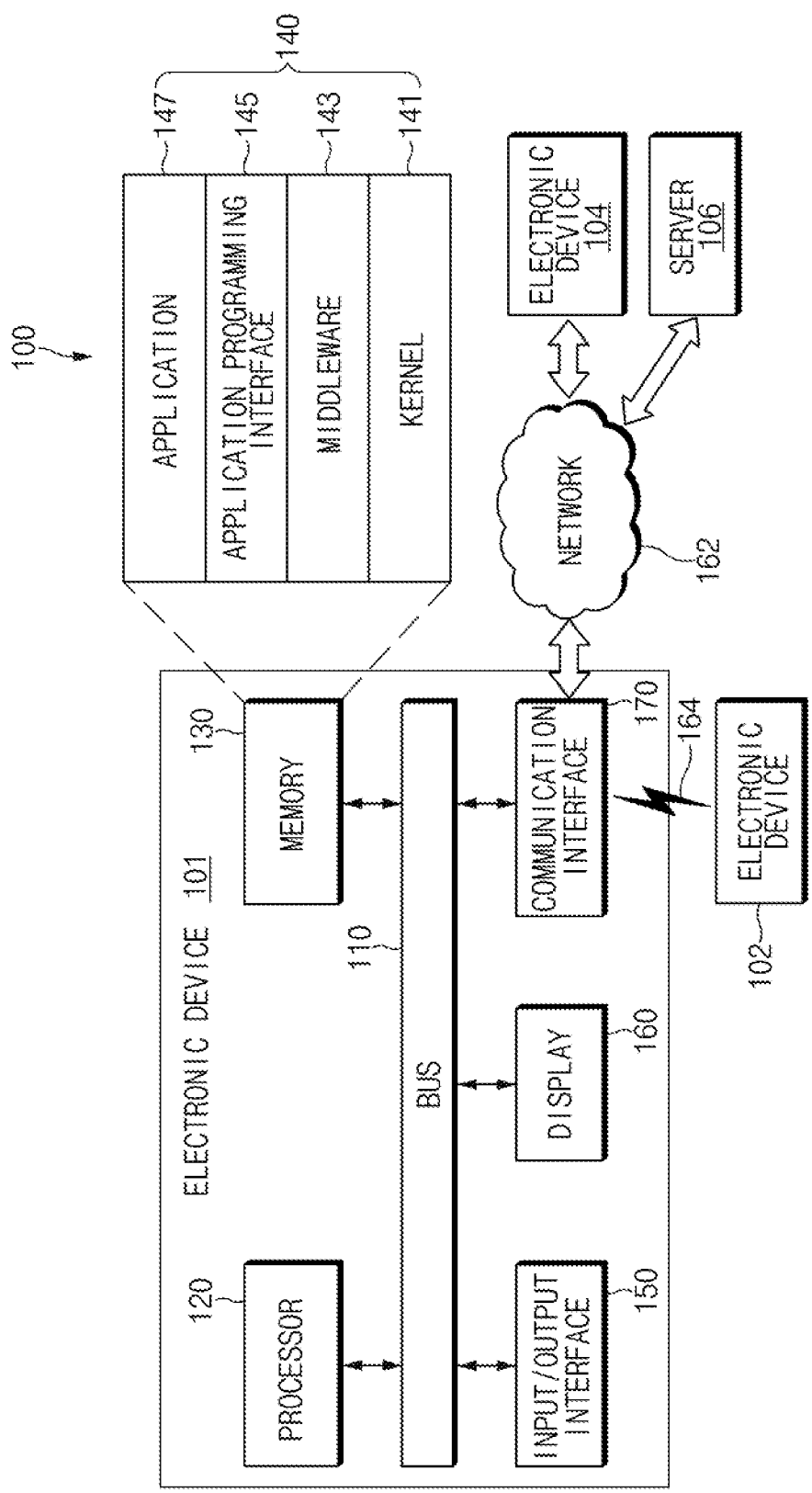
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for", "having the capacity to", "adapted to", "made to", or "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) audio layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, a global navigation satellite system (GNSS), event data recorders (EDRs), flight data recorders (FDRs), vehicle infotainment devices, electronic equipment for vessels (e.g., navigation systems and gyro-compasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

FIG. 1 illustrates an electronic device in a network environment according to various embodiments of the present disclosure.

Referring to FIG. 1, according to various embodiments, an electronic device 101 in a network environment is described. The electronic device 101 may include a bus 110, a processor 120, a memory 130, an input/output interface 150, a display 160, and a communication interface 170.

According to an embodiment, the electronic device 101 may not include at least one of the above-described elements or may further include other element(s). The bus 110 may interconnect the above-described elements 110 to 170 and may include a circuit for conveying communications (e.g., a control message and/or data) among the above-described elements. The processor 120 may include one or more of a CPU, an AP, or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., an instruction) for a file control, a window control, image processing (IP), a character control, or the like. The input/output interface 150 may transmit an instruction or data input from a user or another external device, to other element(s) of the electronic device 101 or may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body. For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

For example, the wireless communication may include cellular communication using at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of wireless fidelity (Wi-Fi), Bluetooth (BT), Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (Beidou), or a European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), power line communication, a plain old telephone service (POTS), or the like. The network 162 may include at least one of telecommunications networks, for example, a computer network (e.g., local area network (LAN) or wide area network (WAN)), an Internet, or a telephone network.

Each of the first and second electronic devices 102 and 104 may be a device of which the type is different from or the same as that of the electronic device 101. According to various embodiments, all or a portion of operations that the electronic device 101 will perform may be executed by another or plural electronic devices (e.g., the first electronic device 102, the second electronic device 104 or the server 106). When the electronic device 101 executes any function or service automatically or in response to a request, the electronic device 101 may not perform the function or the service internally, but, alternatively or additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
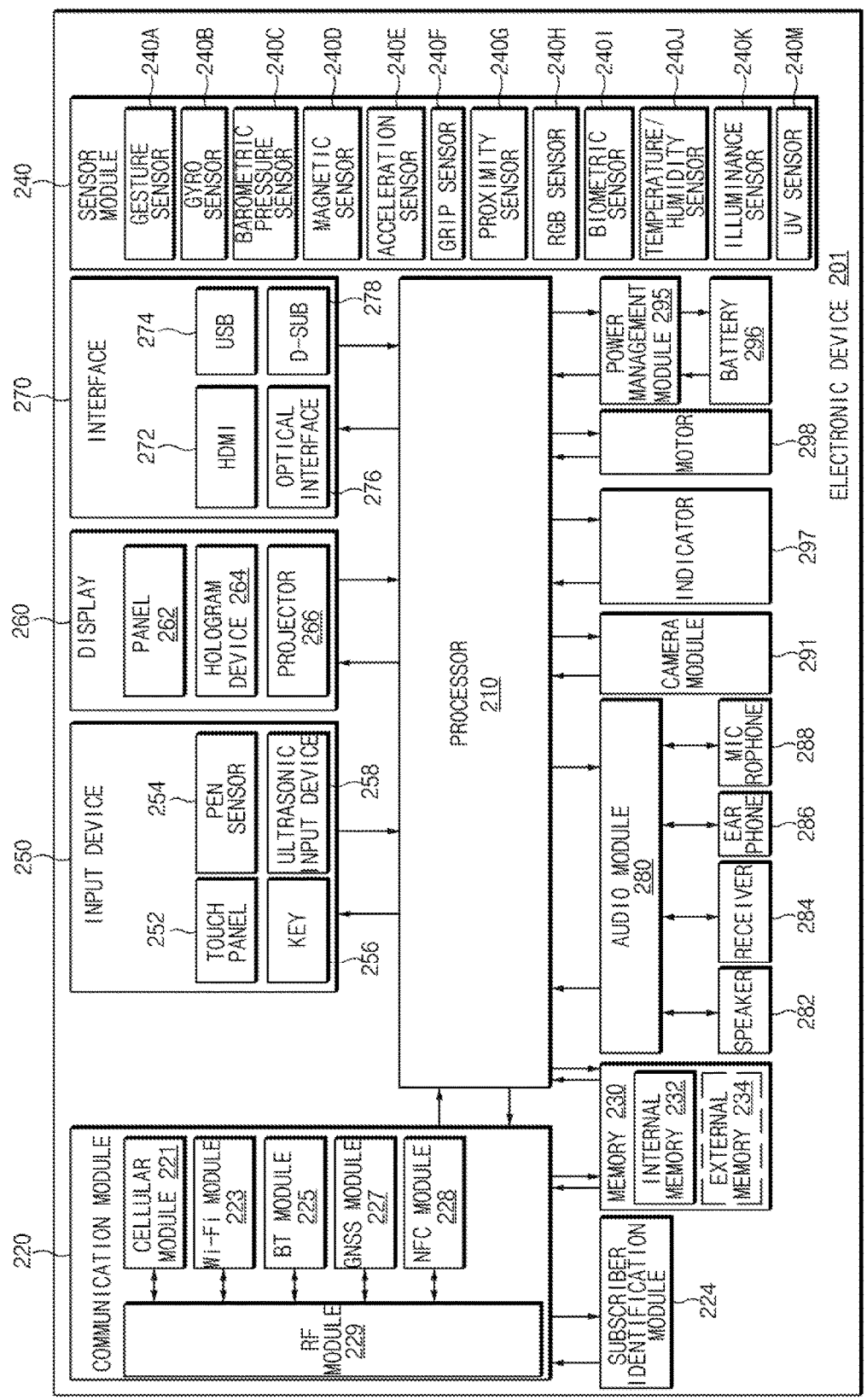
FIG. 2 is a block diagram of an electronic device according to various embodiments of the present disclosure.

FIG. 2 illustrates a block diagram of an electronic device according to various embodiments of the present disclosure.

Referring to FIG. 2, an electronic device 201 may include, for example, all or a part of the electronic device 101 illustrated in FIG. 1. The electronic device 201 may include one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. For example, the processor 210 may be implemented with a system on chip (SoC). According to an embodiment, the processor 210 may further include a graphics processing unit (GPU) and/or an image signal processor (ISP). The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include the cellular module 221, a Wi-Fi module 223, a BT module 225, a GNSS module 227, an NFC module 228, and a RF module 229. The cellular module 221 may provide, for example, voice communication, video communication, a character service, an Internet service, or the like over a communication network. According to an embodiment, the cellular module 221 may perform discrimination and authentication of the electronic device 201 within a communication network by using the SIM (e.g., a SIM card) 224. According to an embodiment, the cellular module 221 may perform at least a portion of functions that the processor 210 provides. According to an embodiment, the cellular module 221 may include a CP. According to an embodiment, at least a part (e.g., two or more) of the cellular module 221, the Wi-Fi module 223, the BT module 225, the GNSS module 227, or the NFC module 228 may be included within one integrated circuit (IC) or an IC package. For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module. The SIM 224 may include, for example, a card and/or embedded SIM that includes a SIM and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a random access memory (RAM), a dynamic RAM (DRAM), a static RAM (SRAM), a synchronous DRAM (SDRAM), or the like), a nonvolatile memory (e.g., a read only memory (ROM), a one-time programmable ROM (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro-SD, mini-SD, extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an ultra violet (UV) sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in a space using a light interference phenomenon. The projector 266 may project light onto a screen to display an image. For example, the screen may be arranged in the inside or the outside of the electronic device 201. The interface 270 may include, for example, a HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high definition link (MHL) interface, a SD card/MMC interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288. For example, the camera module 291 may shoot a still image or a video. According to an embodiment, the camera module 291 may include at least one or more image sensors (e.g., a front sensor or a rear sensor), a lens, an ISP, or a flash (e.g., an LED or a xenon lamp). The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 201) may be omitted or other additional elements may be added. Furthermore, some of the elements of the electronic device may be combined with each other to form one entity, so that the functions of the elements may be performed in the same manner as before the combination.

Figure 3:
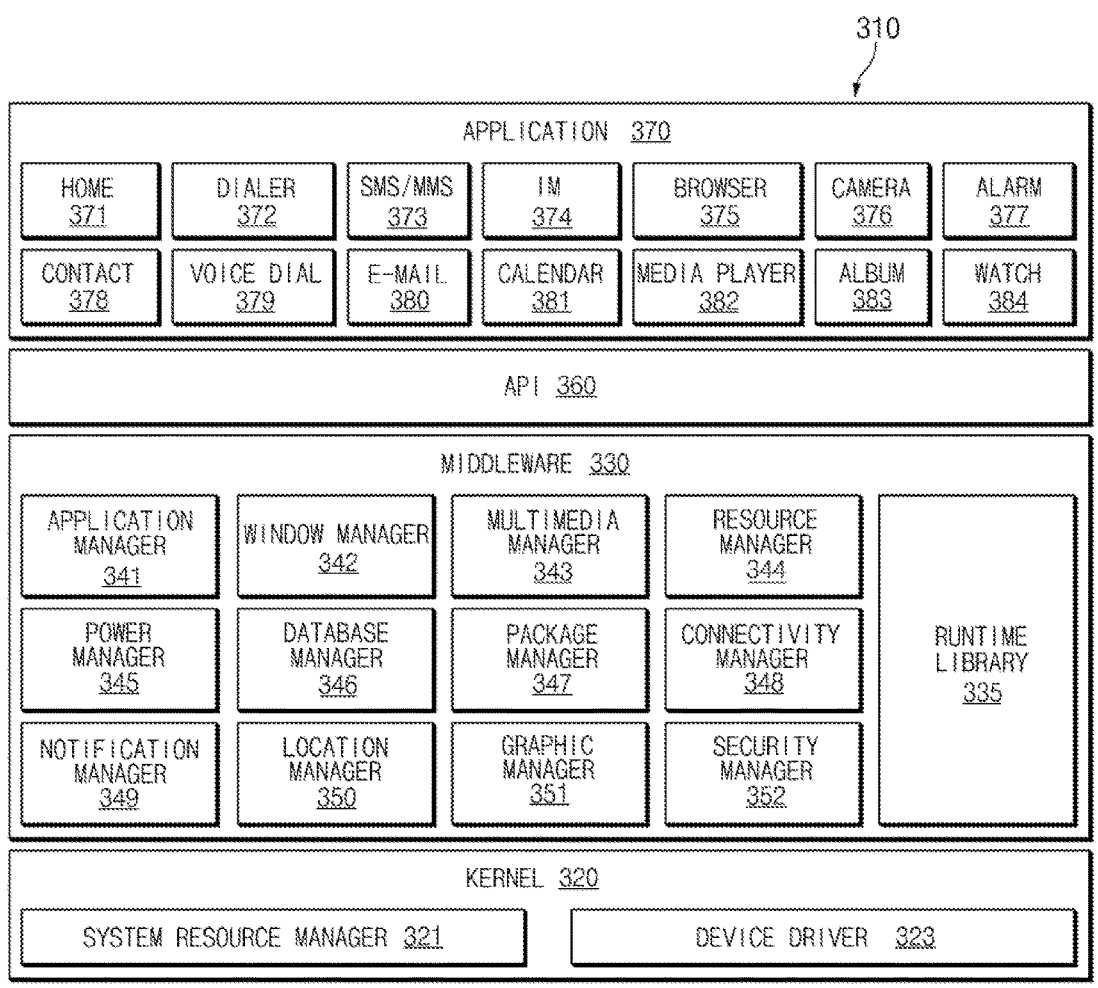
FIG. 3 is a block diagram of a program module according to various embodiments of the present disclosure.

FIG. 3 illustrates a block diagram of a program module according to various embodiments of the present disclosure.

Referring to FIG. 3, a program module 310 (e.g., the program 140) may include an OS to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™. The program module 310 may include a kernel 320 (e.g., the kernel 141), a middleware 330 (e.g., the middleware 143), an API 360 (e.g., the API 145), and/or an application 370 (e.g., the application program 147). At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a BT driver, a shared memory driver, a USB driver, a keypad driver, a Wi-Fi driver, an audio driver, or an inter-process communication (IPC) driver. The middleware 330 may provide, for example, a function that the application 370 needs in common, or may provide diverse functions to the application 370 through the API 360 to allow the application 370 to efficiently use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions. The application manager 341 may manage, for example, a life cycle of at least one application of the application 370. The window manager 342 may manage a graphical user interface (GUI) resource that is used in a screen. The multimedia manager 343 may identify a format necessary for playing diverse media files, and may perform encoding or decoding of media files by using a codec suitable for the format. The resource manager 344 may manage resources such as a memory space or source code of the application 370. The power manager 345 may manage a battery or power, and may provide power information for an operation of an electronic device. According to an embodiment, the power manager 345 may operate with a basic input/output system (BIOS). The database manager 346 may generate, search for, or modify database that is to be used in the application 370. The package manager 347 may install or update an application that is distributed in the form of package file.

The connectivity manager 348 may manage, for example, a wireless connection. The notification manager 349 may provide an event, for example, an arrival message, an appointment, or a proximity notification to a user. For example, the location manager 350 may manage location information about an electronic device. The graphic manager 351 may manage a graphic effect that is provided to a user, or manage a user interface relevant thereto. The security manager 352 may provide, for example, system security or user authentication. According to an embodiment, the middleware 330 may include a telephony manager for managing a voice or video call function of the electronic device or a middleware module that combines diverse functions of the above-described elements. According to an embodiment, the middleware 330 may provide a module specialized to each OS to provide differentiated functions. Additionally, the middleware 330 may dynamically remove a part of the preexisting elements or may add new elements thereto. The API 360 may be, for example, a set of programming functions and may be provided with a configuration that is variable depending on an OS. For example, when an OS is the android or the iOS, it may provide one API set per platform. When the OS is the Tizen, the API 360 may provide two or more API sets.

The application 370 may include, for example, applications such as a home 371, a dialer 372, a short message service (SMS)/multimedia messaging service (MMS) 373, an instant message (IM) 374, a browser 375, a camera 376, an alarm 377, a contact 378, a voice dial 379, an e-mail 380, a calendar 381, a media player 382, an album 383, a watch 384, a health care application (e.g., measuring an exercise quantity, blood sugar, or the like) or offering of environmental information (e.g., information of barometric pressure, humidity, temperature, or the like). According to an embodiment, the application 370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 370 may include an application (e.g., a health care application of a mobile medical device) that is assigned in accordance with an attribute of an external electronic device. According to an embodiment, the application 370 may include an application that is received from an external electronic device. At least a portion of the program module 310 may be implemented by software, firmware, hardware (e.g., the processor 210), or a combination (e.g., execution) of two or more thereof, and may include modules, programs, routines, sets of instructions, processes, or the like for performing one or more functions.

Figure 4:
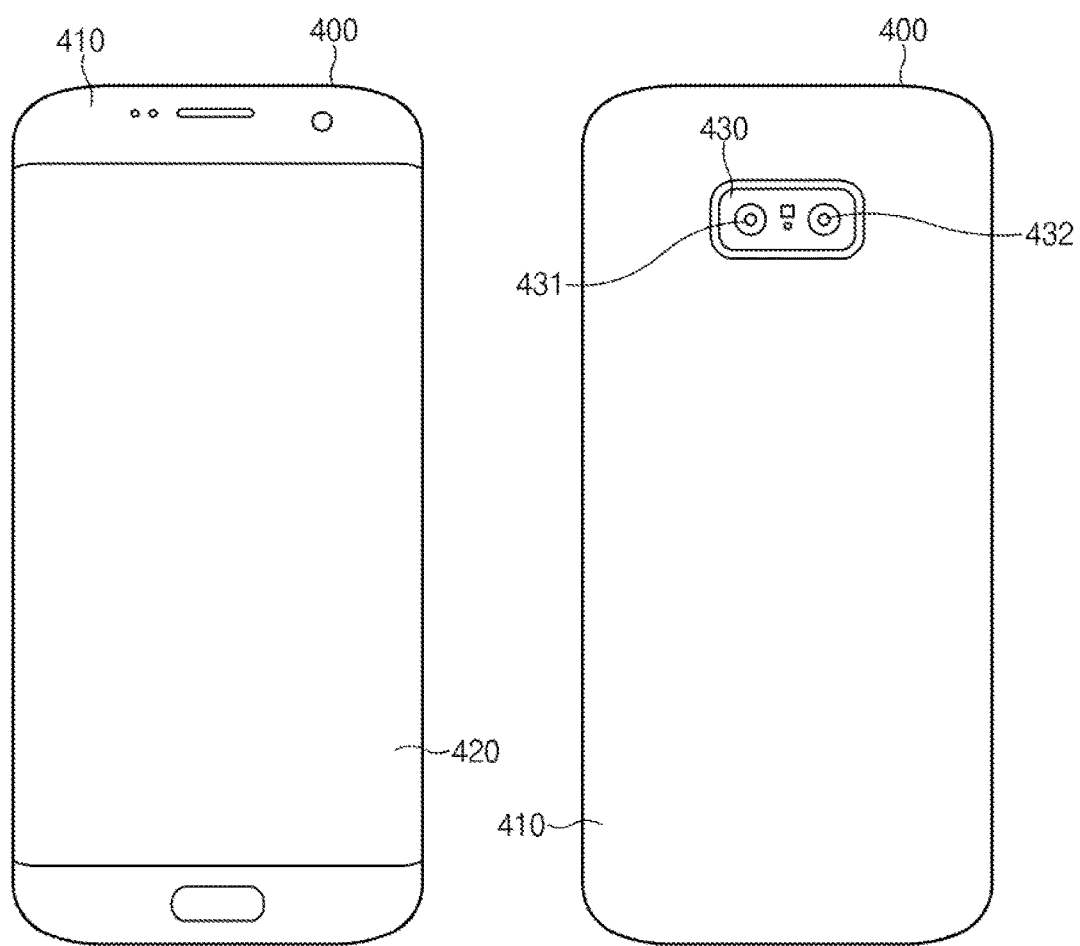
FIG. 4 illustrates a front view and a rear view of an electronic device according to an embodiment of the present disclosure.

FIG. 4 illustrates a front view and a rear view of an electronic device according to an embodiment of the present disclosure.

Referring to FIG. 4, an electronic device 400 according to an embodiment may include a housing 410, a display 420, and a camera module 430. In FIG. 4, the electronic device 400 is exemplified by a smartphone. Without being limited thereto, however, the electronic device 400 may be one of a variety of devices, such as a tablet PC, a wearable device, and the like.

The housing 410 may form the exterior of the electronic device 400. The housing 410 may protect elements inside the electronic device 400. For example, the housing 410 may include a first surface constituting the front side of the electronic device 400, a second surface opposite to the first surface and constituting the rear side of the electronic device 400, and side surfaces surrounding space between the first surface and the second surface.

The display 420 may be exposed through the first surface of the housing 410. For example, the display 420 may be exposed through a cover glass. According to an embodiment, the display 420 may output an image obtained by the camera module 430.

The camera module 430 may be disposed on the rear side of the electronic device 400. The camera module 430 may include a first camera 431 and a second camera 432. The first camera 431 and the second camera 432 may be exposed through the second surface of the housing 410. The first camera 431 and the second camera 432 may be arranged to face the same direction. According to an embodiment, the second camera 432 may be moved by an actuator, a motor, or the like. In this case, the second camera 432 may face a direction different from that of the first camera 431. The first camera 431 and the second camera 432 may include the same or different type of lenses.

Figure 5:
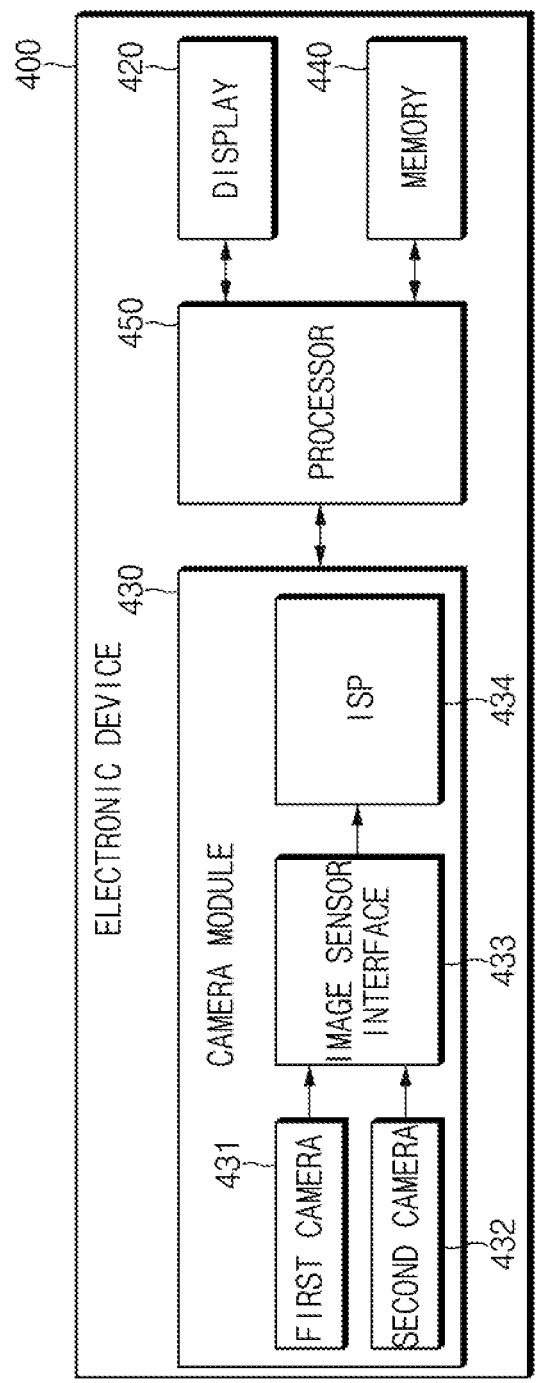
FIG. 5 is a block diagram illustrating a configuration of an electronic device according to an embodiment of the present disclosure.

FIG. 5 is a block diagram illustrating a configuration of an electronic device according to an embodiment of the present disclosure.

Referring to FIG. 5, the electronic device 400 according to an embodiment may include the display 420, the camera module 430, a memory 440, and a processor 450. According to implemented embodiments of the electronic device 400, some of the elements illustrated in FIG. 5 may be omitted, or elements not illustrated in FIG. 5 may be further included. The electronic device 400 may be one of a variety of devices, such as a smartphone, a tablet PC, a wearable device, and the like.

The display 420 may output an image. According to an embodiment, the display 420 may output an image obtained by the camera module 430. For example, the display 420 may output an image obtained by the first camera 431 or an image obtained by the second camera 432. The display 420 may output, on an area thereof, an image obtained by the first camera 431 and may output, on another area thereof, an image obtained by the second camera 432.

The camera module 430 may include the first camera 431, the second camera 432, an image sensor interface 433, and an ISP 434. The first camera 431 and the second camera 432 may each include a lens, an optical image stabilization (OIS) actuator module, an aperture, an image sensor, a shutter, and the like.

The first camera 431 may obtain an image. The first camera 431 may take, for example, a picture or a moving image. The first camera 431 may include, for example, a wide-angle lens.

The second camera 432 may obtain an image. The second camera 432 may take, for example, a picture or a moving image. The second camera 432 may be actuated independently of the first camera 431, and the first camera 431 and the second camera 432 may obtain different images. According to an embodiment, the second camera 432 may be configured to support optical zoom. The second camera 432 may include, for example, a telephoto lens. The second camera 432 may be rotated or moved by an actuator or a motor connected with the second camera 432.

The image sensor interface 433 may allow data transmission or reception between the first and second cameras 431 and 432 and another element (e.g., the ISP 434). For example, the image sensor interface 433 may transfer image data generated by the first camera 431 and the second camera 432 to the ISP 434.

The ISP 434 may include a plurality of IP blocks. The ISP 434 may correct a first image obtained from the first camera 431 and a second image obtained from the second camera 432, through the plurality of IP blocks. The plurality of IP blocks may include a variety of IP blocks, which may be, for example, an IP block for color interpolation, an IP block for lens shading correction, an IP block for auto white balance, an IP block for lateral chromatic aberration correction, an IP block for optical inverse correction, an IP block for noise reduction, an IP block for edge enhancement, an IP block for gamma correction, and/or an IP block for out-of-focusing. The plurality of IP blocks may be referred to as IP filters or IP modules. According to an embodiment, the ISP 434 may be included in the processor 450, and processing by the ISP 434 may be performed after correction or composition by the processor 450.

The memory 440 may store data. The memory 440 may be a volatile memory and/or a non-volatile memory. For example, the memory 440 may store a camera application.

In another example, the memory 440 may store an image obtained by the first camera 431 or the second camera 432.

The processor 450 may be electrically connected with the display 420, the camera module 430, and the memory 440. The processor 450 may control the display 420, the camera module 430, and the memory 440. The processor 450 may execute the camera application stored in the memory 440. The processor 450 may drive the camera module 430 through the camera application and may output an image obtained by the camera module 430 on the display 420.

According to an embodiment, the processor 450 may output the first image obtained by using the first camera 431 on the display 420. For example, the processor 450 may execute the camera application. The processor 450 may obtain the first image by using the first camera 431 after executing the camera application. The first image may be, for example, a preview image or a moving image taken by the first camera 431. The processor 450 may output the acquired first image on the display 420.

According to an embodiment, the processor 450 may determine whether an object included in the first image satisfies a specified condition.

For example, the processor 450 may determine whether an area recognized as a face and included in the first image has a size satisfying the specified condition. The processor 450 may analyze the first image to detect an area in which a person's face is included in the first image (face detection). The processor 450 may detect the area including the face by using various algorithms (e.g., Haar cascade classifier) for face detection. The processor 450 may recognize the size of the area recognized as the face. The processor 450 may determine whether the absolute or relative size of the area recognized as the face satisfies the specified condition. For example, when the first image has a size of 1440×1080, the processor 450 may determine that the specified condition is satisfied, if the area recognized as the face has a size of 180×180 or more, or is about 2% or more of the entire size of the first image. In another example, when the first image has a size of 1920×1080, the processor 450 may determine that the specified condition is satisfied, if the area recognized as the face has a size of 180×180 or more, or is about 1.5% or more of the entire size of the first image. In another example, in the case where the first image has a size of 1088×1088, the processor 450 may determine that the specified condition is satisfied, if the area recognized as the face has a size of 181×181 or more, or is about 2.7% or more of the entire size of the first image.

In another example, the processor 450 may determine whether an area recognized as a moving subject and included in the first image has a size satisfying a specified condition. The processor 450 may analyze the first image to detect the moving subject in the first image. The processor 450 may detect the area including the moving subject by using various algorithms for detection of a moving subject. The processor 450 may recognize the size of the area recognized as the moving subject. The processor 450 may determine whether the absolute or relative size of the area recognized as the moving subject satisfies the specified condition. For example, when the first image has a size of 1440×1080, the processor 450 may determine that the specified condition is satisfied, if the area recognized as the moving subject has a size of 200×200 or more, or is about 2% or more of the entire size of the first image. In another example, when the first image has a size of 1920×1080, the processor 450 may determine that the specified condition is satisfied, if the area recognized as the moving subject has a size of 200×200 or more, or is about 1.5% or more of the entire size of the first image. In another example, when the first image has a size of 1088×1088, the processor 450 may determine that the specified condition is satisfied, if the area recognized as the moving subject has a size of 250×250 or more, or is about 2.7% or more of the entire size of the first image.

According to an embodiment, the processor 450 may output the second image obtained by using the second camera 432 on the display 420 if an object included in the first image satisfies a specified condition. For example, if the specified condition is satisfied, the processor 450 may obtain the second image by using the second camera 432. The processor 450 may zoom in on the identified object by using the second camera 432 to obtain the second image. The processor 450 may automatically track the area recognized as the face or the moving subject. The processor 450 may zoom in on the area recognized as the face or the moving subject by using an optical zoom function of the second camera 432. The processor 450 may zoom in on the corresponding area to obtain the second image. The second image may be a preview image or a moving image taken by the second camera 432.

According to an embodiment, the processor 450 may crop the image obtained by the second camera 432 to obtain the second image. For example, the processor 450 may obtain an image by using the second camera 432. In this case, the second camera 432 may have a narrower field of view than the first camera 431. The processor 450 may crop the acquired image such that the area recognized as the face or the moving subject is located in the center. The processor 450 may obtain the cropped image as the second image.

According to an embodiment, the processor 450 may move the second camera 432 by using an actuator or a motor connected with the second camera 432 to allow the second camera 432 to be directed toward the face or the moving subject. The processor 450 may analyze the first image to compute an angle by which the second camera 432 moves to be directed toward the face or the moving subject. The processor 450 may control the actuator or the motor to allow the second camera 432 to move by the computed angle.

According to an embodiment, the processor 450 may output the acquired second image on the display 420. For example, the processor 450 may output the second image on the entire area of the display 420. In another example, the processor 450 may output the first image on an area of the display 420 and the second image on another area of the display 420. In another example, the processor 450 may output the first image on the entire area of the display 420 and the second image on a partial area within the area on which the first image is displayed (i.e., a picture in picture (PIP)). Illustrative screens including the first image and/or the second image will be described below in detail with reference to FIGS. 6 to 11.

According to an embodiment, the processor 450 may process the second image differently from the first image. For example, the processor 450 may correct the first image and the second image using different techniques. The processor 450 may differently apply, to the first image and the second image, correction techniques, for example, color interpolation, lens shading correction, white balance, lateral chromatic aberration correction, optical inverse correction, noise reduction, edge enhancement, gamma correction, and/or out-of-focusing. The processor 450 may store the processed first and/or second image in the memory 440.

Figure 6:
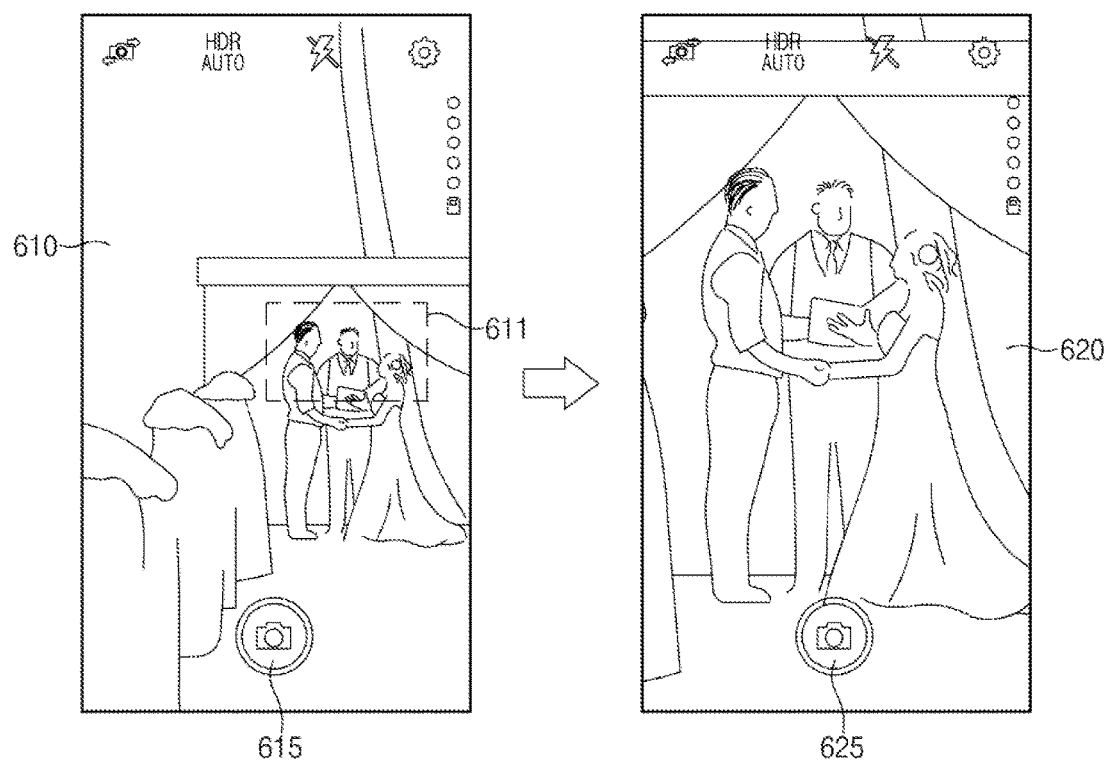
FIG. 6 illustrates an illustrative preview image output on a display of an electronic device according to an embodiment of the present disclosure.

FIG. 6 illustrates an illustrative preview image output on a display of an electronic device according to an embodiment of the present disclosure.

It may be understood that operations mentioned as being performed by the electronic device 400 in the description of FIG. 6 are controlled by the processor 450 of the electronic device 400.

Referring to FIG. 6, the electronic device according to an embodiment may obtain a first image 610 by using a first camera (e.g., the first camera 431). The electronic device may display the first image 610 on a display (e.g., the display 420). The electronic device may analyze the first image 610 to detect a face in the first image 610. When a plurality of faces are included in the first image 610 and located within a specified distance, the electronic device may detect a first area 611 including the plurality of faces.

Figure 9:
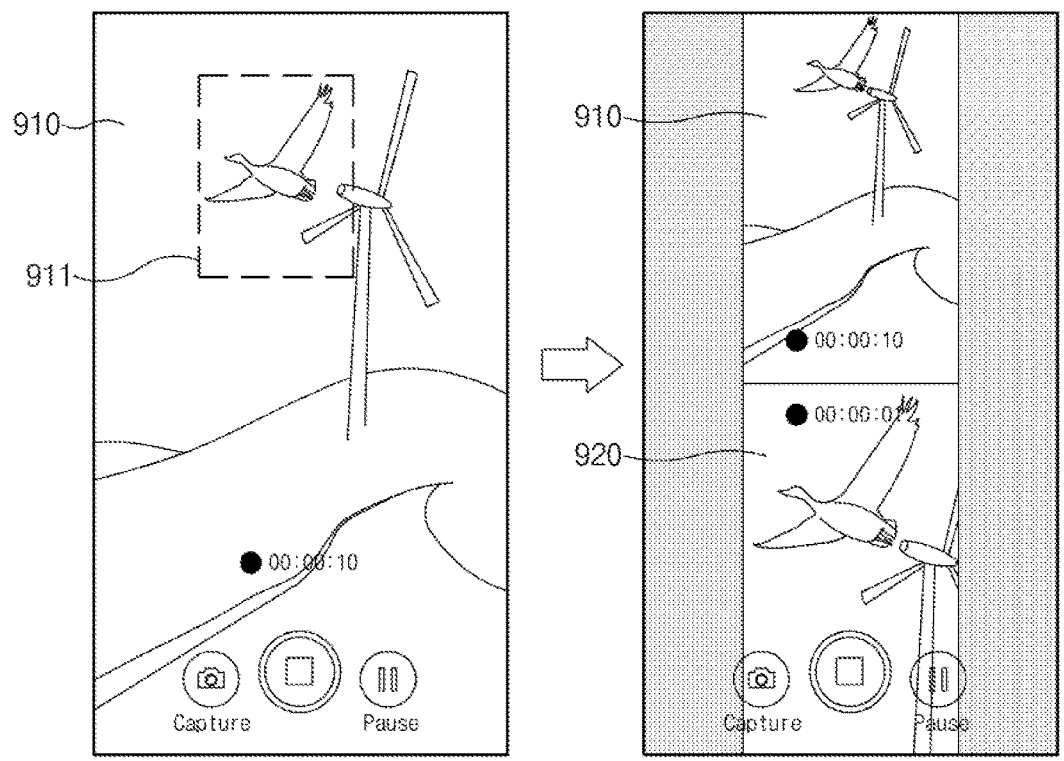
FIG. 9 illustrates an illustrative moving image output on a display of an electronic device according to an embodiment of the present disclosure.

According to an embodiment, if the size of the faces satisfy a specified condition (e.g., if the first image 610 has a size of 1440×1080, and the faces have a size of 180×180 or more), the electronic device may obtain a second image 620 by using a second camera (e.g., the second camera 432). For example, if at least one of the plurality of faces included in the first area 611 satisfies the specified condition, the electronic device may obtain the second image 620 by using the second camera. The electronic device may zoom in on the first area 611 by using the second camera to obtain the second image 620. According to an embodiment, the electronic device may zoom in on the faces included in the first area 611 and bodies connected with the faces by using the second camera to obtain the second image 620. For example, the electronic device may recognize the faces and then may recognize the bodies connected with the faces by using a depth map. The electronic device may display the second image 620 on the display. In the example of FIG. 6, the electronic device displays the second image 620 on the entire area of the display. Without being limited thereto, however, the electronic device may display the first image 610 on an upper side of the display and the second image 620 on a lower side of the display, as illustrated in FIG. 9.

According to an embodiment, the electronic device may display, on the display, a user interface for saving the first image 610, saving the second image 620, or saving the first image 610 and the second image 620. For example, the electronic device may save the first image 610 if an input is applied to a first capture button 615, and may save the second image 620 if an input is applied to a second capture button 625. In another example, the electronic device may save both the first image 610 and the second image 620 if an input is applied to the second capture button 625.

Figure 7:
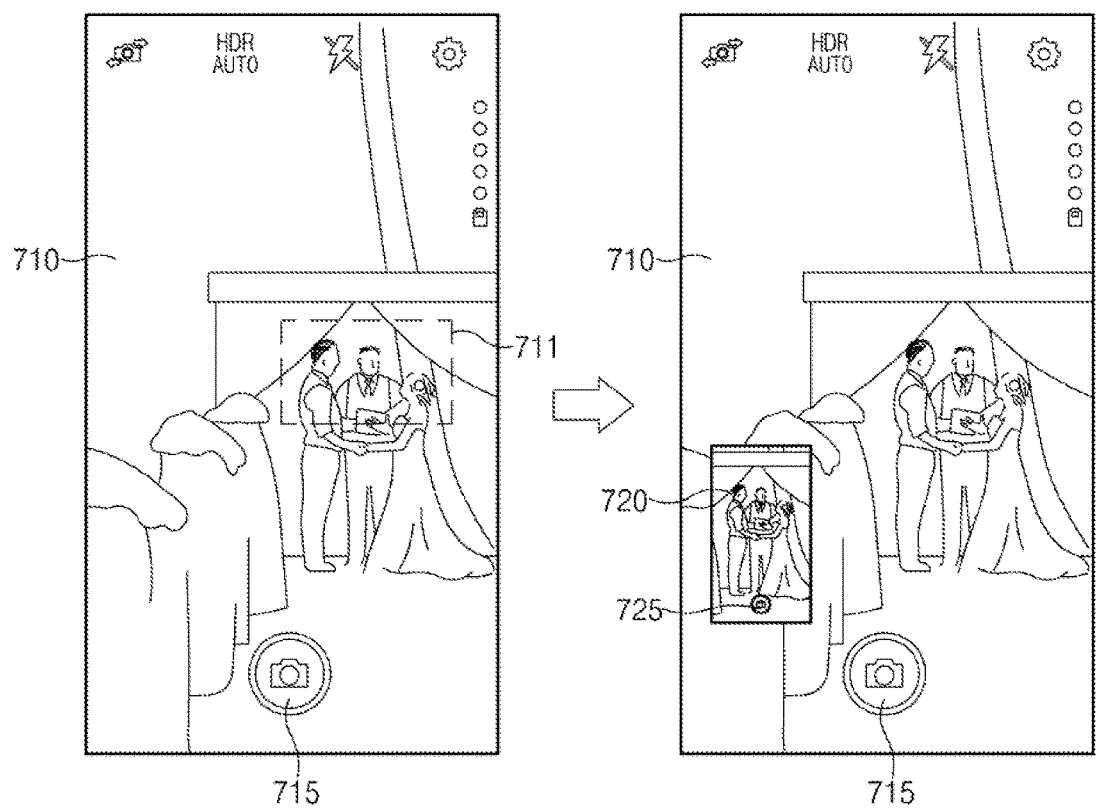
FIG. 7 illustrates an illustrative preview image output on a display of an electronic device according to an embodiment of the present disclosure.

FIG. 7 illustrates an illustrative preview image output on a display of an electronic device according to an embodiment of the present disclosure.

It may be understood that operations mentioned as being performed by the electronic device 400 in the description of FIG. 7 are controlled by the processor 450 of the electronic device 400.

Referring to FIG. 7, the electronic device according to an embodiment may obtain a first image 710 by using a first camera. The electronic device may display the first image 710 on a display. The electronic device may analyze the first image 710 to detect a first area 711 including a plurality of faces in the first image 710.

According to an embodiment, if the size of the faces satisfy a specified condition, the electronic device may obtain a second image 720 by using a second camera. The electronic device may display the second image 720 on the display.

According to an embodiment, the electronic device may output the first image 710 on a first area of the display and the second image 720 on a second area of the display that is included in the first area of the display. For example, the electronic device may display the first image 710 on the entire area of the display and may display the second image 720 on a partial area within the area on which the first image 710 is displayed by using a PIP function.

According to an embodiment, the electronic device may display, on the display, a user interface for saving the first image 710, saving the second image 720, or saving the first image 710 and the second image 720. For example, the electronic device may save the first image 710 if an input is applied to a first capture button 715, and may save the second image 720 if an input is applied to a second capture button 725. In another example, the electronic device may save both the first image 710 and the second image 720 if an input is applied to the first capture button 715 after the second image 720 is displayed on the display.

Figure 8:
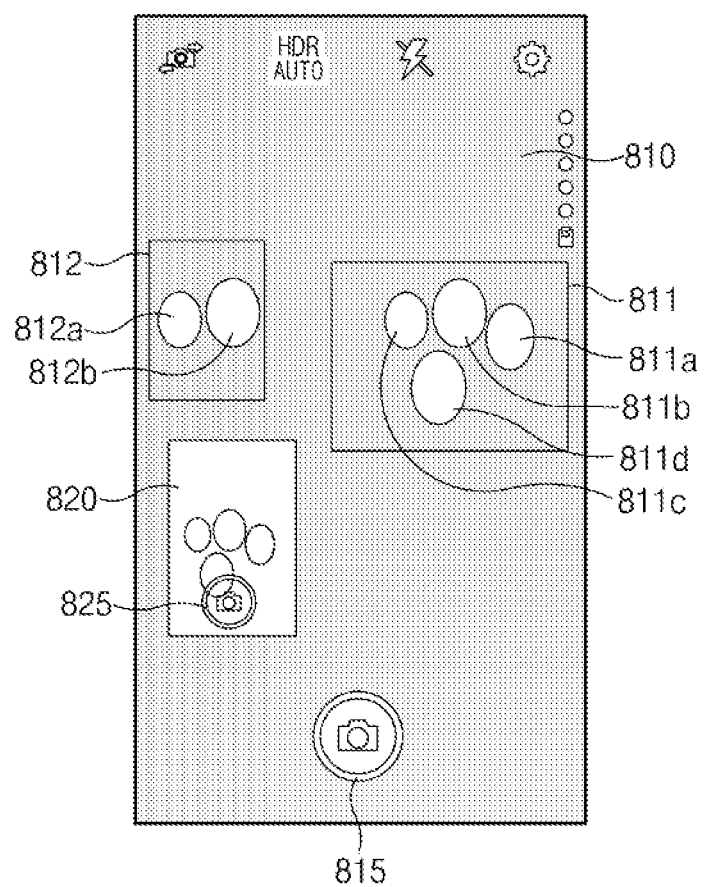
FIG. 8 illustrates an illustrative preview image output on a display of an electronic device according to an embodiment of the present disclosure.

FIG. 8 illustrates an illustrative preview image output on a display of an electronic device according to an embodiment of the present disclosure.

It may be understood that operations mentioned as being performed by the electronic device 400 in the description of FIG. 8 are controlled by the processor 450 of the electronic device 400.

Referring to FIG. 8, the electronic device according to an embodiment may obtain a first image 810 by using a first camera. The electronic device may analyze the first image 810 to recognize a first face 811*a*, a second face 811*b*, a third face 811*c*, a fourth face 811*d*, a fifth face 812*a*, and a sixth face 812*b*. The electronic device may classify the plurality of faces into one or more groups based on the distances between the plurality of faces. For example, the electronic device may group the first face 811*a*, the second face 811*b*, the third face 811*c*, and the fourth face 811*d*, which are located within a specified distance, as a first group and may group the fifth face 812*a* and the sixth face 812*b*, which are located within a specified distance, as a second group. The electronic device may recognize a first area 811 including the first group and a second area 812 including the second group.

According to an embodiment, the electronic device may obtain a second image 820 of one of the one or more groups by using a second camera. The electronic device may obtain the second image 820 of a group including the greatest number of faces, among the one or more groups, by using the second camera. For example, the electronic device may obtain the second image 820 by zooming in on the first area 811 including the first group that includes a larger number of faces than the second group.

According to an embodiment, the electronic device may display, on a display, a guide through which to select one of the one or more groups. For example, the electronic device may display a guide line representing the first area 811 or the second area 812 on the display. The electronic device may obtain an image of a group selected through the guide, by using the second camera. For example, if a user of the electronic device selects the second area 812, the electronic device may obtain an image of the second group. The electronic device may zoom in on the second area 812 including the second group to obtain an image of the second group. The electronic device may display the image of the second group on the area on which the second image 820 is displayed.

According to an embodiment, the electronic device may display, on the display, a user interface for saving the first image 810, saving the second image 820, or saving the first image 810 and the second image 820. For example, the electronic device may save the first image 810 if an input is applied to a first capture button 815, and may save the second image 820 if an input is applied to a second capture button 825. In another example, the electronic device may save both the first image 810 and the second image 820 if an input is applied to the second capture button 825.

FIG. 9 illustrates an illustrative moving image output on a display of an electronic device according to an embodiment of the present disclosure.

It may be understood that operations mentioned as being performed by the electronic device 400 in the description of FIG. 9 are controlled by the processor 450 of the electronic device 400.

Referring to FIG. 9, the electronic device according to an embodiment may obtain a first image 910 by using a first camera. The electronic device may display the first image 910 on a display. The electronic device may analyze the first image 910 to detect a moving subject in the first image 910. The electronic device may detect a first area 911 including the moving subject.

According to an embodiment, if the size of the moving subject satisfies a specified condition (e.g., if the first image 910 has a size of 1440×1080, and the moving subject has a size of 200×200 or more), the electronic device may obtain a second image 920 by using a second camera. For example, the electronic device may zoom in on the first area 911 by using the second camera to obtain the second image 920.

According to an embodiment, the electronic device may display the second image 920 on the display. For example, the electronic device may display the first image 910 on an upper side of the display and the second image 920 on a lower side of the display.

Figure 10:
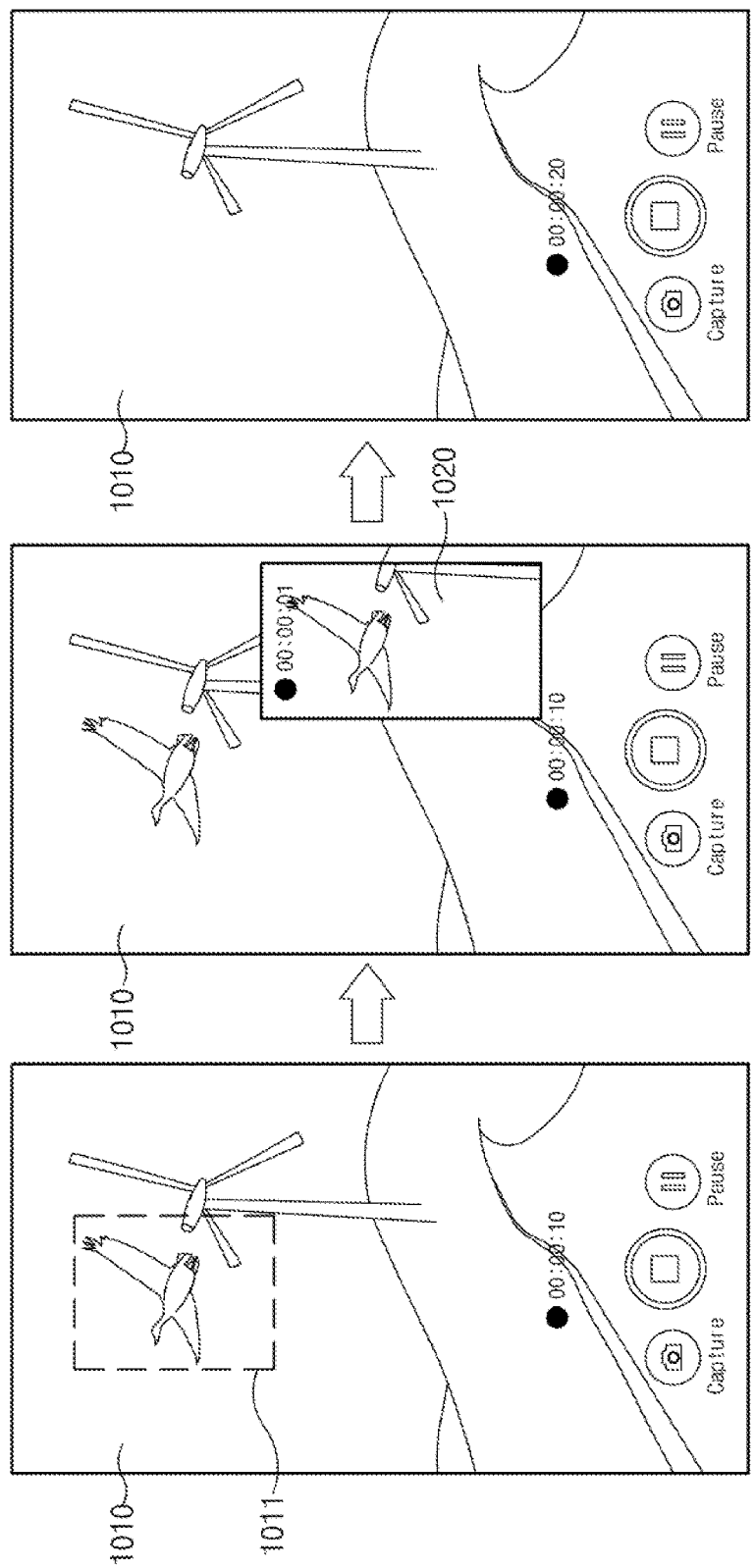
FIG. 10 illustrates an illustrative moving image output on a display of an electronic device according to an embodiment of the present disclosure.

FIG. 10 illustrates an illustrative moving image output on a display of an electronic device according to an embodiment of the present disclosure.

It may be understood that operations mentioned as being performed by the electronic device 400 in the description of FIG. 10 are controlled by the processor 450 of the electronic device 400.

Referring to FIG. 10, the electronic device according to an embodiment may obtain a first image 1010 by using a first camera. The electronic device may display the first image 1010 on a display. The electronic device may analyze the first image 1010 to detect a moving subject in the first image 1010. The electronic device may detect a first area 1011 including the moving subject.

According to an embodiment, if the size of the moving subject satisfies a specified condition (e.g., if the first image 1010 has a size of 1440×1080, and the moving subject has a size of 200×200 or more), the electronic device may obtain a second image 1020 by using a second camera. For example, the electronic device may zoom in on the first area 1011 by using the second camera to obtain the second image 1020. The electronic device may display the second image 1020 on the display. For example, the electronic device may display the first image 1010 on the display and may display the second image 1020 on a partial area within the first image 1010 using a PIP function.

According to an embodiment, the electronic device may automatically track the moving subject. The electronic device may obtain the second image 1020 of the area including the moving subject by consistently tracking the moving subject. When the moving subject is outside the field of view of the first camera, the electronic device may stop actuating the second camera. Even when the moving subject stops, the electronic device may stop actuating the second camera. The electronic device may stop displaying the second image 1020 and may display only the first image 1010 on the display.

Figure 11:
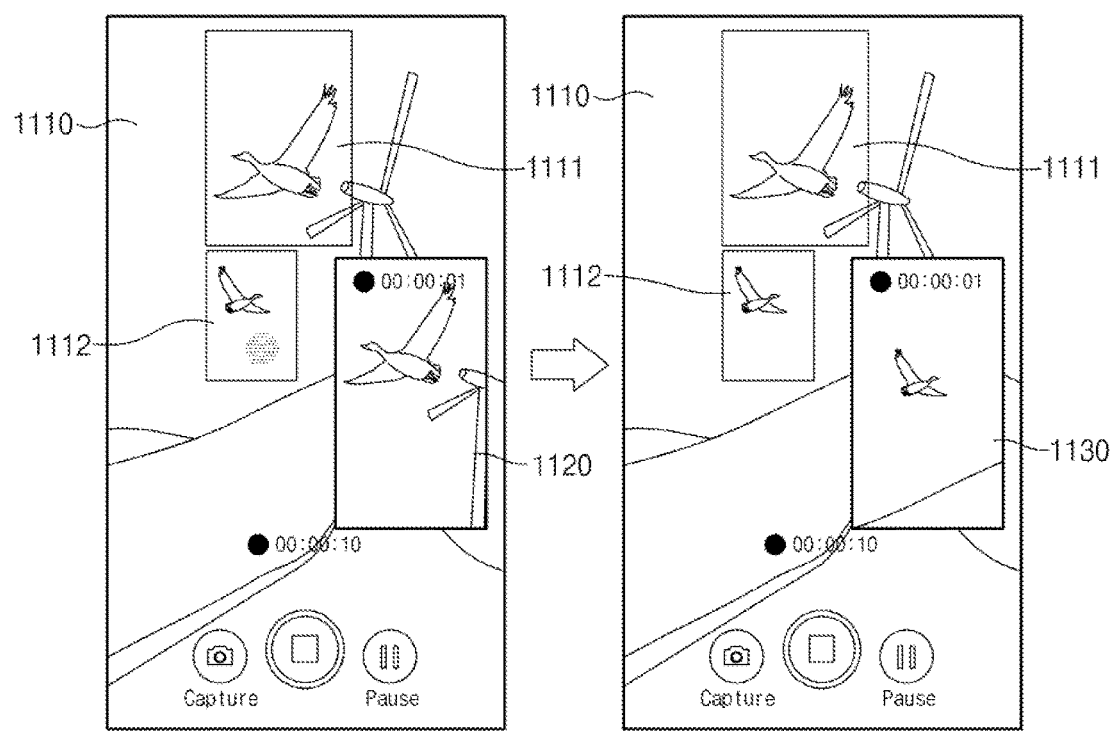
FIG. 11 illustrates an illustrative moving image output on a display of an electronic device according to an embodiment of the present disclosure.

FIG. 11 illustrates an illustrative moving image output on a display of an electronic device according to an embodiment of the present disclosure.

It may be understood that operations mentioned as being performed by the electronic device 400 in the description of FIG. 11 are controlled by the processor 450 of the electronic device 400.

Referring to FIG. 11, the electronic device may obtain a first image 1110 by using a first camera. The electronic device may display the first image 1110 on a display. The electronic device may analyze the first image 1110 to detect moving subjects in the first image 1110. The electronic device may recognize a first area 1111 and a second area 1112, each of which includes a moving subject.

According to an embodiment, if two or more moving subjects satisfy a specified condition are recognized in the first image 1110, the electronic device may display, on the display, a guide through which to select one of the two or more subjects. For example, the electronic device may display, on the display, a guide line that represents the first area 1111 including a first subject and the second area 1112 including a second subject. The electronic device may obtain an image of a moving subject selected through the guide, by using a second camera.

For example, if the first area 1111 is selected, the electronic device may zoom in on the first area 1111 by using the second camera to obtain a second image 1120. The electronic device may display the second image 1120 on a partial area within the area on which the first image 1110 is displayed. In another example, if the second area 1112 is selected, the electronic device may zoom in on the second area 1112 by using the second camera to obtain a third image 1130. The electronic device may display the third image 1130 on a partial area within the area on which the first image 1110 is displayed.

Figure 12:
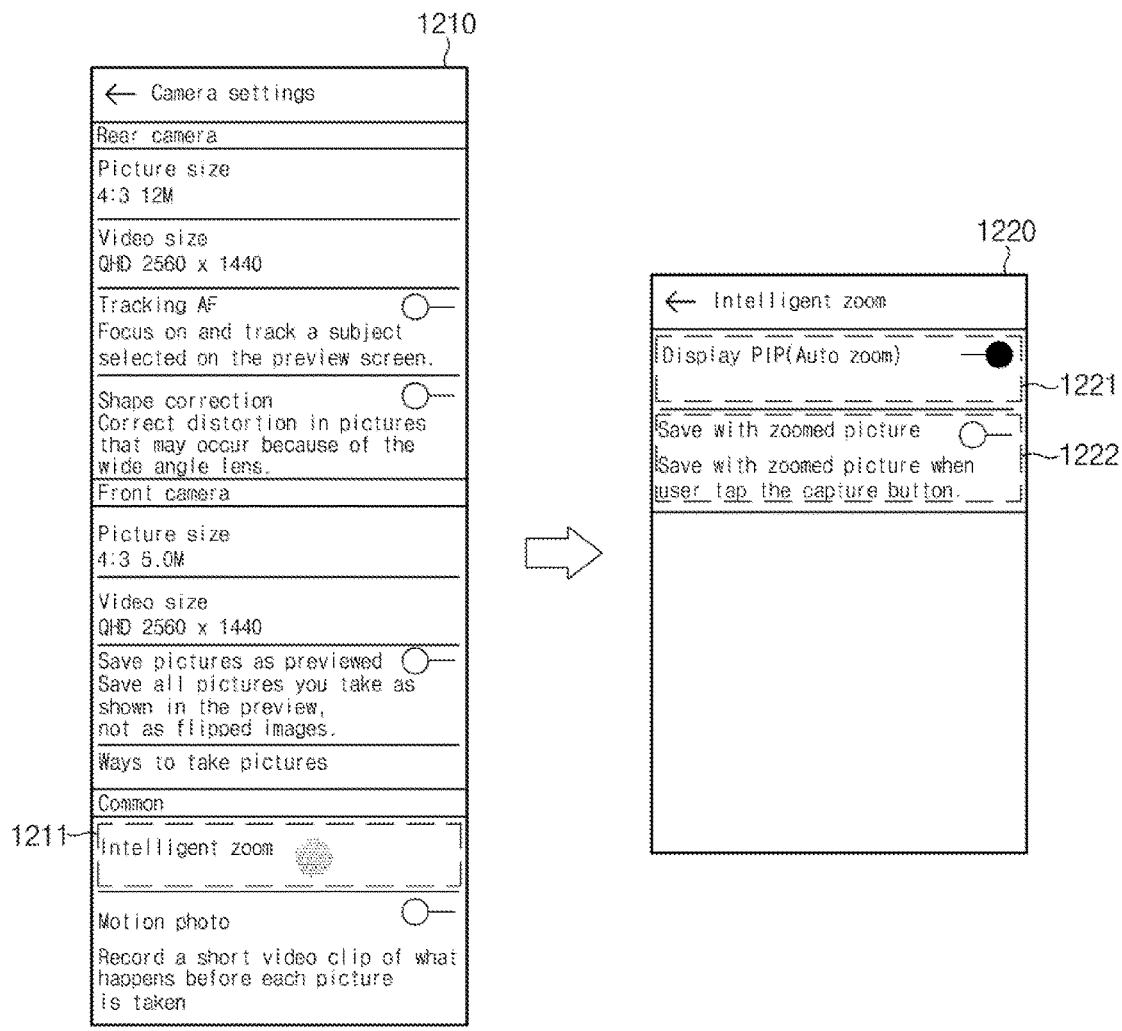
FIG. 12 illustrates an illustrative user interface output on a display of an electronic device according to an embodiment of the present disclosure.

FIG. 12 illustrates an illustrative user interface output on a display of an electronic device according to an embodiment of the present disclosure.

It may be understood that operations mentioned as being performed by the electronic device 400 in the description of FIG. 12 are controlled by the processor 450 of the electronic device 400.

Referring to FIG. 12, the electronic device may display, on a display, a first user interface 1210 for settings of a camera module included in the electronic device. The first user interface 1210 may include a plurality of menus for setting, for example, a picture size, a video size, autofocusing, intelligent zoom, and the like. If an input is applied to an intelligent zoom menu 1211, the electronic device may display, on the display, a second user interface 1220 for setting an intelligent zoom function.

For example, the second user interface 1220 may include a first menu 1221 for selecting whether to automatically output the above-described second image on the display. If the first menu 1221 is enabled, the electronic device may automatically output the above-described second image on the display by recognizing a face or a moving subject automatically included in the first image when the first image is taken.

In another example, the second user interface 1220 may include a second menu 1222 for selecting whether to simultaneously save the above-described first and second images. If the second menu 1222 is enabled, the electronic device may automatically save both the first image and the second image when an input is applied to a capture button.

Figure 13:
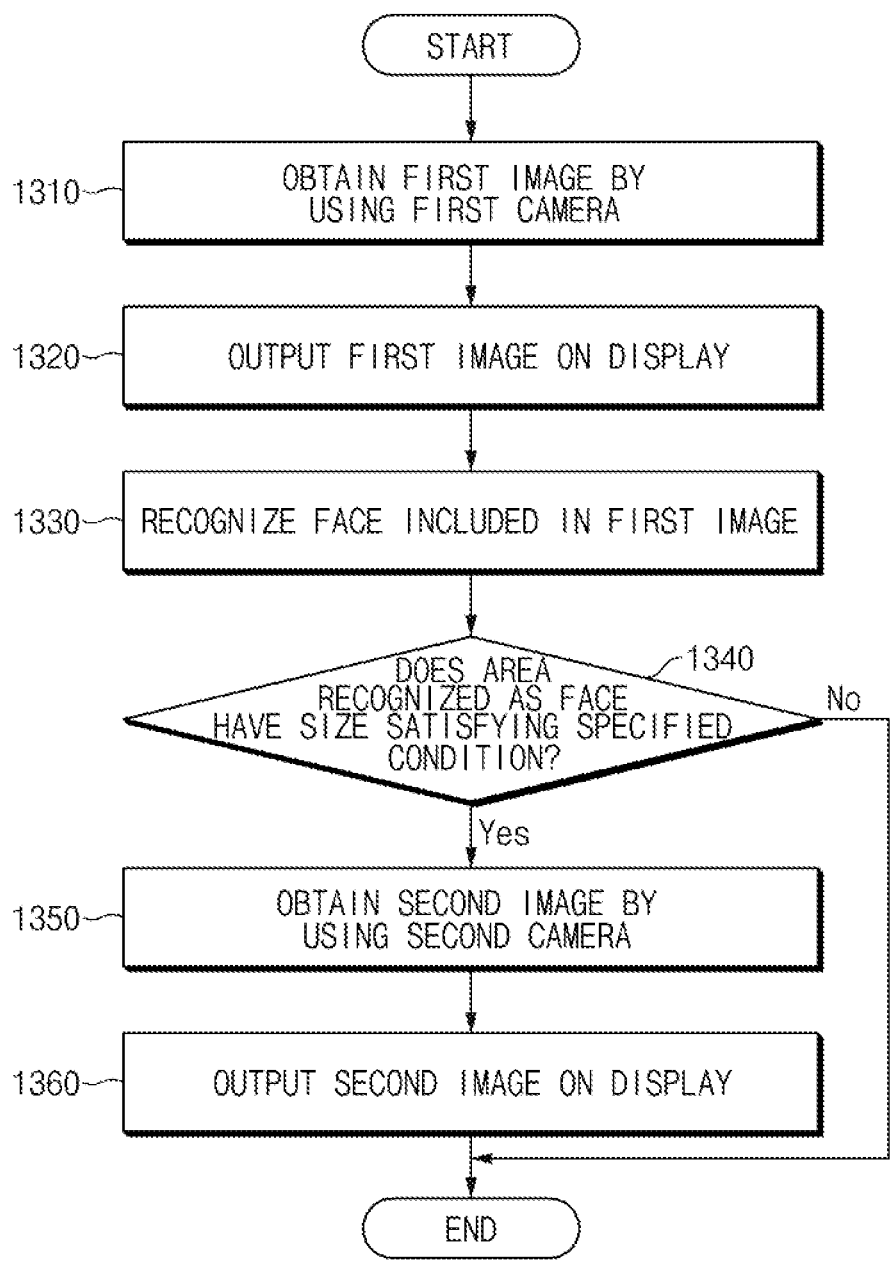
FIG. 13 is a flowchart illustrating an image capture method of an electronic device according to an embodiment of the present disclosure.

FIG. 13 is a flowchart illustrating an image capture method of an electronic device according to an embodiment of the present disclosure.

Hereinafter, it is assumed that the electronic device 400 of FIGS. 4 and 5 performs the process illustrated in FIG. 13. Furthermore, it may be understood that operations mentioned as being performed by the electronic device 400 in the description of FIG. 13 are controlled by the processor 450 of the electronic device 400.

Referring to FIG. 13, in operation 1310, the electronic device may obtain a first image by using a first camera. For example, if a camera application is executed, the electronic device may drive the first camera including a wide-angle lens to obtain the first image.

In operation 1320, the electronic device may output the first image on a display. For example, the electronic device may output, on the display, a preview image of a picture to be taken by the first camera or a moving image being taken by the first camera.

In operation 1330, the electronic device may recognize a face included in the first image. For example, the electronic device may analyze the first image to recognize a person's face included in the first image. The electronic device may recognize an area within the outline of the face and may recognize a rectangular area including the face. The electronic device may also recognize an area including a plurality of faces.

In operation 1340, the electronic device may determine whether the size of the area recognized as the face satisfies a specified condition. For example, the electronic device may determine whether the size of the area recognized as the face relative to the first image satisfies the specified condition. The specified condition may be varied depending on the size of the first image.

If the specified condition is satisfied, the electronic device may, in operation 1350, obtain a second image by using a second camera. For example, if the specified condition is satisfied, the electronic device may actuate the second camera. The electronic device may zoom in on the area recognized as the face by using an optical zoom function of the second camera. The electronic device may obtain a zoomed-in image as the second image. The electronic device may obtain the second image by cropping the zoomed-in image with respect to the area recognized as the face. Also, the electronic device may obtain the second image by directing the second camera toward the face by moving or rotating the second camera using an actuator.

In operation 1360, the electronic device may output the second image on the display. For example, the electronic device may output, on the display, a preview image of a picture to be taken by the second camera or a moving image being taken by the second camera. The electronic device may output the first image on an area of the display and the second image on another area of the display. The electronic device may simultaneously output the first image and the second image by using a PIP function.

Figure 14:
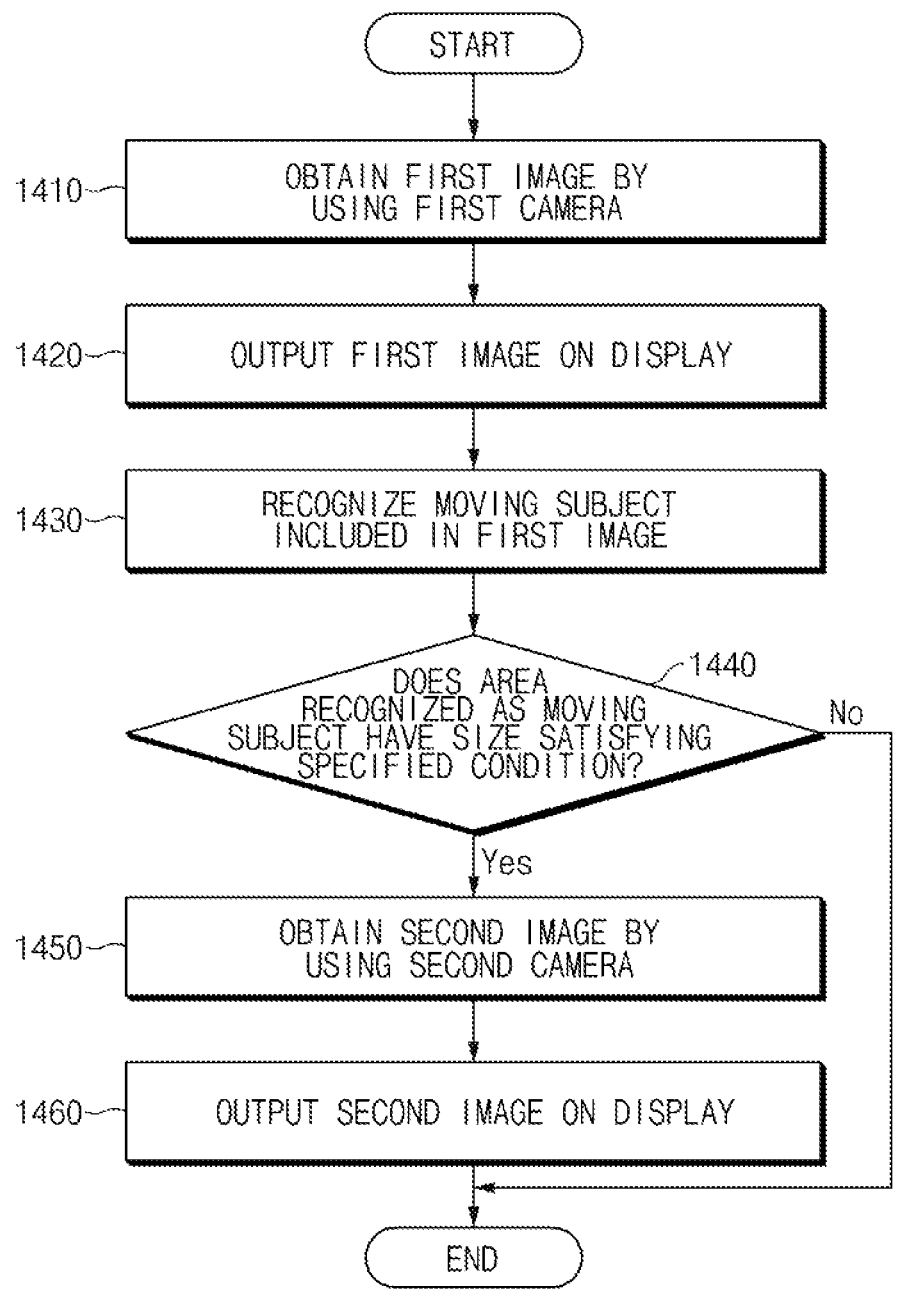
FIG. 14 is a flowchart illustrating an image capture method of an electronic device according to an embodiment of the present disclosure.

FIG. 14 is a flowchart illustrating an image capture method of an electronic device according to an embodiment of the present disclosure.

Hereinafter, it is assumed that the electronic device 400 of FIGS. 4 and 5 performs the process illustrated in FIG. 14. Furthermore, it may be understood that operations mentioned as being performed by the electronic device 400 in the description of FIG. 14 are controlled by the processor 450 of the electronic device 400. Repetitive description of the operations described with reference to FIG. 13 will be omitted for the convenience of description.

Referring to FIG. 14, in operation 1410, the electronic device may obtain a first image by using a first camera.

In operation 1420, the electronic device may output the first image on a display.

In operation 1430, the electronic device may track a moving subject included in the first image. For example, the electronic device may analyze the first image to recognize the moving subject included in the first image. The electronic device may recognize an area within the outline of the moving subject and may recognize a rectangular area including the moving subject. Also, the electronic device may recognize a plurality of rectangular areas including a plurality of subjects. The electronic device may consistently track the moving subject to recognize the area including the moving subject.

In operation 1440, the electronic device may determine whether the size of the area recognized as the moving subject satisfies a specified condition. For example, the electronic device may determine whether the size of the area recognized as the moving subject relative to the first image satisfies the specified condition. The specified condition may be varied depending on the size of the first image.

If the specified condition is satisfied, the electronic device may, in operation 1450, obtain a second image by using a second camera. For example, if the specified condition is satisfied, the electronic device may actuate the second camera. The electronic device may zoom in on the area recognized as the moving subject by using an optical zoom function of the second camera. The electronic device may obtain a zoomed-in image as the second image. The electronic device may obtain the second image by cropping the zoomed-in image with respect to the area recognized as the moving subject. Also, the electronic device may obtain the second image by directing the second camera toward the moving subject by moving or rotating the second camera using an actuator or a motor.

In operation 1460, the electronic device may output the second image on the display.

The term "module" used in this disclosure may include a unit composed of hardware, software and firmware and may be interchangeably used with the terms "unit", "logic", "logical block", "component" and "circuit". The "module" may be an integrated component or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 130) in the form of a program module. The instruction, when executed by a processor (e.g., the processor 120), may cause the processor to perform a function corresponding to the instruction. A computer-readable recording medium may include a hard disk, a floppy disk, a magnetic media (e.g., a magnetic tape), an optical media (e.g., a compact disc ROM (CD-ROM) and a DVD, a magneto-optical media (e.g., a floptical disk)), and an internal memory. Also, a program instruction may include not only a mechanical code such as things generated by a compiler but also a high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing;
a display exposed through a first surface of the housing;
a first camera exposed through a second surface of the housing, the second surface being opposite to the first surface;
a second camera exposed through the second surface;
a memory configured to store an image obtained by the first camera or the second camera; and
a processor electrically connected with the display, the first camera, the second camera, and the memory,
wherein the processor is configured to:
output a first image obtained by the first camera on the display, and
if an area recognized as a face in the first image has a size satisfying a specified condition, obtain a second image by zooming in on a subject corresponding to the area using the second camera which is different from the first camera and display the second image.

2. The electronic device of claim 1,
wherein the first image is a preview image or a moving image captured by the first camera, and
wherein the second image is a preview image or a moving image captured by the second camera.

3. The electronic device of claim 1, wherein, if the area recognized as the face in the first image has the size satisfying the specified condition, the processor is further configured to concurrently output the first image on a first area of the display and the second image on a second area of the display.

4. The electronic device of claim 1, wherein, if the area recognized as the face in the first image has the size satisfying the specified condition, the processor is further configured to output the first image on a first area of the display and the second image on a second area that is included in the first area.

5. The electronic device of claim 1, wherein the second camera is configured to support optical zoom.

6. The electronic device of claim 1,
wherein the first camera includes a wide-angle lens, and
wherein the second camera includes a telephoto lens.

7. The electronic device of claim 1, wherein, when the second image is obtained, the processor is further configured to zoom in on the face and a body of the subject using the second camera.

8. The electronic device of claim 1, wherein the processor is further configured to:
if a plurality of faces are recognized in the first image, classify the plurality of faces into one or more groups based on a distance between the plurality of faces, and
obtain the second image having a group including a greatest number of faces among the one or more groups.

9. The electronic device of claim 1, wherein the processor is further configured to:
if a plurality of faces are recognized in the first image, classify the plurality of faces into one or more groups based on a distance between the plurality of faces,
display, on the display, a guide to select one of the one or more groups, and
obtain the second image based on a group selected through the guide.

10. The electronic device of claim 1, wherein the processor is further configured to:
process the first image,
process the second image differently from the first image, and
store the second image in the memory.

11. The electronic device of claim 1, wherein the processor is further configured to display, on the display, a user interface for saving the first image, saving the second image, or saving the first image and the second image.

12. The electronic device of claim 1, wherein the processor is further configured to display, on the display, a user interface for simultaneously saving the first image and the second image.

13. The electronic device of claim 1, wherein the processor is further configured to display, on the display, a user interface for automatically outputting the second image on the display.

14. An image capture method of an electronic device including a first camera and a second camera, the image capture method comprising:
obtaining a first image using the first camera;
outputting the first image;
recognizing a face included in the first image;
if an area including the face in the first image has a size satisfying a specified condition, obtaining a second image by zooming in on a subject corresponding to the area using the second camera which is different from the first camera; and
outputting the second image.

15. An electronic device comprising:
a housing;
a display exposed through a first surface of the housing;
a first camera exposed through a second surface of the housing, the second surface being opposite to the first surface;
a second camera exposed through the second surface;
a memory configured to store an image obtained by the first camera or the second camera; and
a processor electrically connected with the display, the first camera, the second camera, and the memory,
wherein the processor is configured to:
output a first image obtained by the first camera on the display, and
if an area recognized as a moving subject in the first image has a size satisfying a specified condition, output a second image obtained by the second camera on the display.

16. The electronic device of claim 15,
wherein the first image is a preview image or a moving image captured by the first camera, and
wherein the second image is a preview image or a moving image captured by the second camera.

17. The electronic device of claim 15, wherein the processor is further configured to automatically track the moving subject included in the first image.

18. The electronic device of claim 15, wherein the processor is further configured to:
- if two or more moving subjects are recognized in the first image based on the specified condition, display, on the display, a guide to select one of the two or more moving subjects; and
- obtain the second image of a moving subject selected through the guide.

19. The electronic device of claim 15, wherein, if the moving subject stops or is outside a field of view of the second camera, the processor is further configured to stop actuating of the second camera.

* * * * *